(12) United States Patent
Hirata

(10) Patent No.: US 7,571,599 B2
(45) Date of Patent: Aug. 11, 2009

(54) EXHAUST GAS PURIFICATION APPARATUS OF ENGINE

(75) Inventor: Kiminobu Hirata, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 0 days.

(21) Appl. No.: 10/566,367

(22) PCT Filed: Jul. 23, 2004

(86) PCT No.: PCT/JP2004/010487

§ 371 (c)(1),
(2), (4) Date: Oct. 30, 2006

(87) PCT Pub. No.: WO2005/012702

PCT Pub. Date: Feb. 10, 2005

(65) Prior Publication Data

US 2007/0186542 A1   Aug. 16, 2007

(30) Foreign Application Priority Data

Jul. 30, 2003   (JP)   ............................. 2003-282359

(51) Int. Cl.
F01N 3/00   (2006.01)

(52) U.S. Cl. .............................. 60/286; 60/289; 60/301; 60/303

(58) Field of Classification Search .................... 60/276, 60/285, 286, 301, 303
See application file for complete search history.

(56) References Cited

U.S. PATENT DOCUMENTS 5,116,579 A * 5/1992 Kobayashi et al. .......... 422/111
5,431,893 A   7/1995 Hug et al.
5,605,042 A * 2/1997 Stutzenberger ............... 60/286
5,884,475 A * 3/1999 Hofmann et al. .............. 60/274
5,974,789 A * 11/1999 Mathes et al. ................. 60/274
6,041,594 A * 3/2000 Brenner et al. ................ 60/309
6,050,088 A * 4/2000 Brenner ....................... 60/303
6,167,698 B1 * 1/2001 King et al. ..................... 60/286
6,260,353 B1 * 7/2001 Takahashi ..................... 60/286
6,912,846 B2 * 7/2005 Huber et al. .................. 60/286

FOREIGN PATENT DOCUMENTS

JP   64000311   1/1989
JP   6-7643     1/1994

(Continued)

Primary Examiner—Thomas E Denion
Assistant Examiner—Diem Tran
(74) Attorney, Agent, or Firm—McDermott Will & Emery LLP

(57) ABSTRACT

A liquid reducing agent of a necessary amount according to an engine operating condition is injection-supplied from a nozzle having an injection hole opening to inside an exhaust gas passage, positioned on an exhaust gas upstream side of a nitrogen oxide reduction catalyst. On the other hand, when an injection flow rate of the liquid reducing agent becomes zero, compressed air stored in a purge air tank is supplied into the nozzle for a predetermined time. Thus, the liquid reducing agent remaining in the nozzle is forcibly discharged by the compressed air, and hence even if the nozzle is at a high temperature due to the exhaust heat, a situation where reducing agent constituents are deposited does not occur, and clogging of the inside of the nozzle can be prevented.

2 Claims, 4 Drawing Sheets

| | FOREIGN PATENT DOCUMENTS | |
|---|---|---|
| JP | 7-279650 | 10/1995 |
| JP | 2000-27627 | 1/2000 |
| JP | 2000-257419 | 9/2000 |
| JP | 2002-97940 | 4/2002 |
| JP | 2002-332825 | * 11/2002 |

* cited by examiner

US 7,571,599 B2

EXHAUST GAS PURIFICATION APPARATUS OF ENGINE

This is a U.S. National Stage of PCT/JP2004/010487, filed on Jul. 23, 2004.

BACKGROUND OF THE INVENTION

1. Field of the Invention

The present invention relates to an exhaust gas purification apparatus of an engine (referred to hereunder as "exhaust gas purification apparatus"), which reduces the nitrogen oxide (NOx) in the exhaust gas using a liquid reducing agent. In particular, it relates to technology for preventing a failure in the reduction and purification of NOx.

2. Description of the Related Art

As an exhaust gas purification apparatus for removing NOx contained in engine exhaust gas, a type disclosed in Japanese Unexamined Patent Publication No. 2000-27627 has been proposed. In such an exhaust gas purification apparatus, a NOx reduction catalyst is arranged in an engine exhaust gas passage in order to convert NOx into harmless nitrogen ($N_2$) and oxygen ($O_2$) in an oxygenated atmosphere filled with excessive amount of oxygen. Furthermore, a construction is adopted in which an amount of liquid reducing agent as required according to the engine operating state, is supplied by injection from a nozzle into the exhaust gas upstream of the NOx reduction catalyst, in order to enhance the efficiency of NOx purification in the NOx reduction catalyst.

In such an exhaust gas purification apparatus, when the nozzle is at a high temperature due to the exhaust heat, and the injection supply of the liquid reducing agent is stopped, there is a possibility that water content from the liquid reducing agent remaining inside the nozzle evaporates, and reducing agent constituents are deposited and become attached to the inside of the nozzle, thus causing it to become clogged. If clogging occurs in the nozzle, then even though injection supply of the liquid reducing agent is restarted afterwards, there is concern that liquid reducing agent of a necessary amount corresponding to the engine operating conditions is not supplied to the NOx reduction catalyst, and the NOx in the exhaust is exhausted into the atmosphere without being sufficiently reduced and purified.

SUMMARY OF THE INVENTION

Therefore, taking the above described existing problems into consideration, an object of the present invention is to provide an exhaust gas purification apparatus in which clogging in a nozzle is prevented, and a failure in the reduction and purification of NOx due to a shortage in the supply of the liquid reducing agent is suppressed, by supplying high pressure air into the nozzle when the injection supply of the liquid reducing agent is stopped.

Therefore, in accordance with the present invention, there is provided an exhaust gas purification apparatus, which comprises: a nitrogen oxide reduction catalyst arranged in an engine exhaust gas passage, in order to reduce and purify nitrogen oxide in exhaust gas using a liquid reducing agent; a nozzle whose injection hole opens into the exhaust gas passage, positioned on an exhaust gas upstream side of the nitrogen oxide reduction catalyst; an operating state detecting device for detecting an engine operating state; a reducing agent injection supply device for injection supplying a liquid reducing agent into the exhaust gas passage from the nozzle injection hole, based on the engine operating state detected by the operating state detecting device; and a high pressure air supply device for supplying high pressure air into the nozzle for a predetermined period, when an injection flow rate of the liquid reducing agent from the reducing agent injection supply device becomes zero.

According to the present invention, when the injection flow rate of the liquid reducing agent, which is injection supplied into the engine exhaust gas passage from the nozzle injection hole, becomes zero, high pressure air is supplied into the nozzle for a predetermined period. As a result, when the injection supply of the liquid reducing agent is stopped, even if liquid reducing agent remains in the nozzle, it is forcibly discharged to the exhaust gas passage by the high pressure air. Consequently, even if the nozzle is at a high temperature due to the exhaust heat, the situation where the water content evaporates from the liquid reducing agent remaining thereinside, and the reducing agent constituents are deposited does not occur, and hence clogging of the nozzle can be prevented. Furthermore, since clogging of the nozzle is prevented, the liquid reducing agent in the nitrogen oxide reduction catalyst does not become insufficient, and hence the nitrogen oxide can be kept from being exhausted into the atmosphere without being sufficiently reduced and purified.

DESCRIPTION OF THE PREFERRED EMBODIMENTS

A detailed description of the present invention is provided hereunder, with reference to the accompanying drawings.

Figure 1:
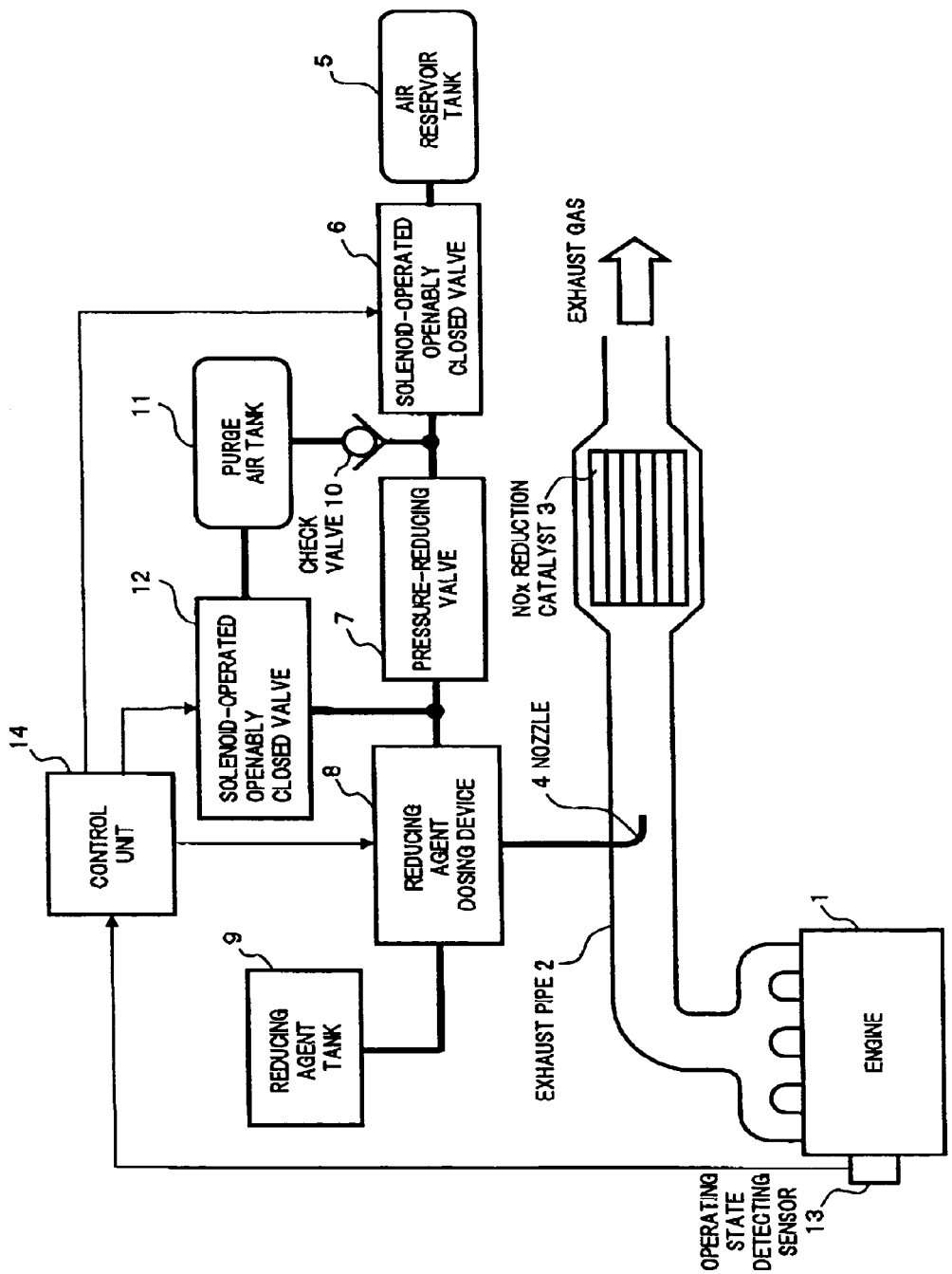
FIG. 1 is a view illustrating a structural constitution of an exhaust gas purification apparatus according to a first embodiment of the present invention.

FIG. 1 shows the overall construction of a first embodiment of an exhaust gas purification apparatus according to the present invention.

Referring to FIG. 1, a NOx reduction catalyst 3 for reducing and purifying the NOx in an exhaust gas is provided in an exhaust pipe 2 constituting an exhaust gas passage of an engine 1. The NOx reduction catalyst 3 is of a construction where for example a zeolite type active ingredient, is supported by a monolithic type catalyst support having a honeycomb shaped cross-section comprising ceramic cordierite, or an Fe—Cr—Al type heat-resistant steel. Moreover, the catalyst ingredient supported by the catalyst support, receives a supply of a liquid reducing agent such as a urea water solution, gasoline, a diesel oil, alcohol or the like, and is activated, to thereby effectively convert the NOx into a harmless substance.

A nozzle 4 is provided on the exhaust gas upstream side of the NOx reduction catalyst 3, to injection-supply a liquid reducing agent from an injection hole which opens into the exhaust pipe 2.

Compressed air, which is pressurized to between 700 and 1000 kPa, is stored in an air reservoir tank 5. The compressed air stored in the air reservoir tank 5 passes through a solenoid operated openably closed valve 6, which is a normally-closed valve, and a pressure-reducing valve 7 (pressure-reducing device), in sequence, and is supplied to a reducing agent dosing device 8. The air reservoir tank 5 may be shared with an air reservoir tank provided for other purposes. Furthermore, liquid reducing agent stored in a reducing agent tank 9 is supplied to the reducing agent dosing device 8.

The reducing agent dosing device 8 doses the liquid reducing agent to the compressed air to transform it into an atomized state, by the operation of a built-in pump, and afterwards supplies it to the nozzle 4. The dosing flow rate of the liquid reducing agent, that is, the injection flow rate of the liquid reducing agent, can be optionally varied by controlling the operation of the pump. Moreover, the reducing agent dosing device 8 has the interior thereof in communication with the nozzle 4 such that the supplied compressed air can be constantly supplied to the nozzle 4 at all times.

The compressed air stored in the air reservoir tank 5 is branched after passing through the solenoid-operated openably closed valve 6, and is supplied to a purge air tank 11 via a check valve 10. Therefore, the purge air tank 11 stores compressed air substantially the same pressure as the air reservoir tank 5. The check valve 10 is installed in a direction whereby it prevents the compressed air from flowing back from the purge air tank 11 to downstream of the solenoid-operated openably closed valve 6. Moreover, the compressed air stored in the purge air tank 11 is supplied to the reducing agent dosing device 8 via a solenoid-operated openably closed valve 12 that is also a normally-closed valve.

The engine 1 is provided with an operating state detecting sensor 13 (operating state detecting device) for detecting its rotational speed and load. Here, for the engine load, it is possible to use the intake air flow rate, intake negative pressure, throttle opening, accelerator opening, fuel injection quantity, turbocharging pressure, or the like. A control unit 14 with a built-in computer, receives the rotational speed and load from the operating state detecting sensor 13, and operates and controls; the built-in pump in the reducing agent dosing device 8, the solenoid-operated openably closed valve 6, and the solenoid-operated openably closed valve 12, executing a control program stored in a ROM (Read Only Memory).

The air reservoir tank 5, the solenoid-operated openably closed valve 6, the pressure-reducing valve 7, the reducing agent dosing device 8, the reducing agent tank 9, and the control unit 14, constitute a reducing agent injection supply device. Furthermore, the purge air tank 11, the solenoid-operated openably closed valve 12, and the control unit 14 constitute a high pressure air supply device.

Next, a description of the operation of such an exhaust gas purification apparatus will be provided below.

When the engine 1 is operated, the exhaust gas is exhausted to the exhaust pipe 2. At this time, the control unit 14 reads the rotational speed and load from the operating state detecting sensor 13, and calculates the dosing flow rate of the liquid reducing agent required for the reduction and purification of the NOx in the exhaust gas. Then, when the dosing flow rate of the liquid reducing agent is not zero, the control unit 14 opens the solenoid-operated openably closed valve 6, and operates and controls the built-in pump in the reducing agent dosing device 8 according to the dosing flow rate. As a result, the compressed air stored in the air reservoir tank 5 is reduced to a predetermined pressure by the pressure-reducing valve 7, and supplied to the reducing agent dosing device 8. Then, liquid reducing agent with the flow rate required for the reduction and purification of the NOx in the exhaust gas, is mixed with the compressed air whose pressure is reduced, and transformed into an atomized state, and is injection-supplied from the nozzle 4 into the exhaust pipe 2. Then, the liquid reducing agent injection-supplied from the nozzle 4 is supplied to the NOx reduction catalyst 3 and mixed with the exhaust gas at the same time, and the NOx in the exhaust gas is reduced and purified in the NOx reduction catalyst 3.

On the other hand, when the dosing flow rate of the liquid reducing agent is zero, the control unit 14 closes the solenoid-operated openably closed valve 6, stops the operation of the built-in pump in the reducing agent dosing device 8, and stops the injection-supply of the liquid reducing agent to the inside of the exhaust pipe 2. Afterwards, the control unit 14 opens the solenoid-operated openably closed valve 12 for a predetermined period, to thereby supply the compressed air stored in the purge air tank 11 to the reducing agent dosing device 8, and inject the compressed air from the injection hole of the nozzle 4 to the inside of the exhaust pipe 2. Therefore, when the injection-supply of the liquid reducing agent is stopped, even if liquid reducing agent remains in the nozzle 4, it is forcibly discharged to inside the exhaust pipe 2 by the compressed air, thus preventing liquid reducing agent constituents from being deposited and becoming attached to the inside of the nozzle 4. Consequently, it is difficult for the inside of the nozzle 4 to become clogged, and hence the injection supply of the liquid reducing agent can be ensured. Therefore, the supply of the liquid reducing agent to the NOx reduction catalyst 3 does not become insufficient, and hence the NOx is prevented from being exhausted to the atmosphere without being sufficiently reduced and purified. Moreover, since the liquid reducing agent is injection-supplied from the nozzle 4 in an atomized state, the liquid reducing agent is supplied to the NOx reduction catalyst 3 almost uniformly, and hence it is possible to perform the reduction and purification of the NOx efficiently.

The pressure of the purge air tank 11 is reduced due to the consumption of the compressed air stored therein. However, when the solenoid-operated openably closed valve 6 is opened, the compressed air stored in the air reservoir tank 5 is automatically supplied to the purge air tank 11 via the check valve 10. Therefore, the compressed air in the purge air tank 11 is maintained within a predetermined range.

Figure 2:
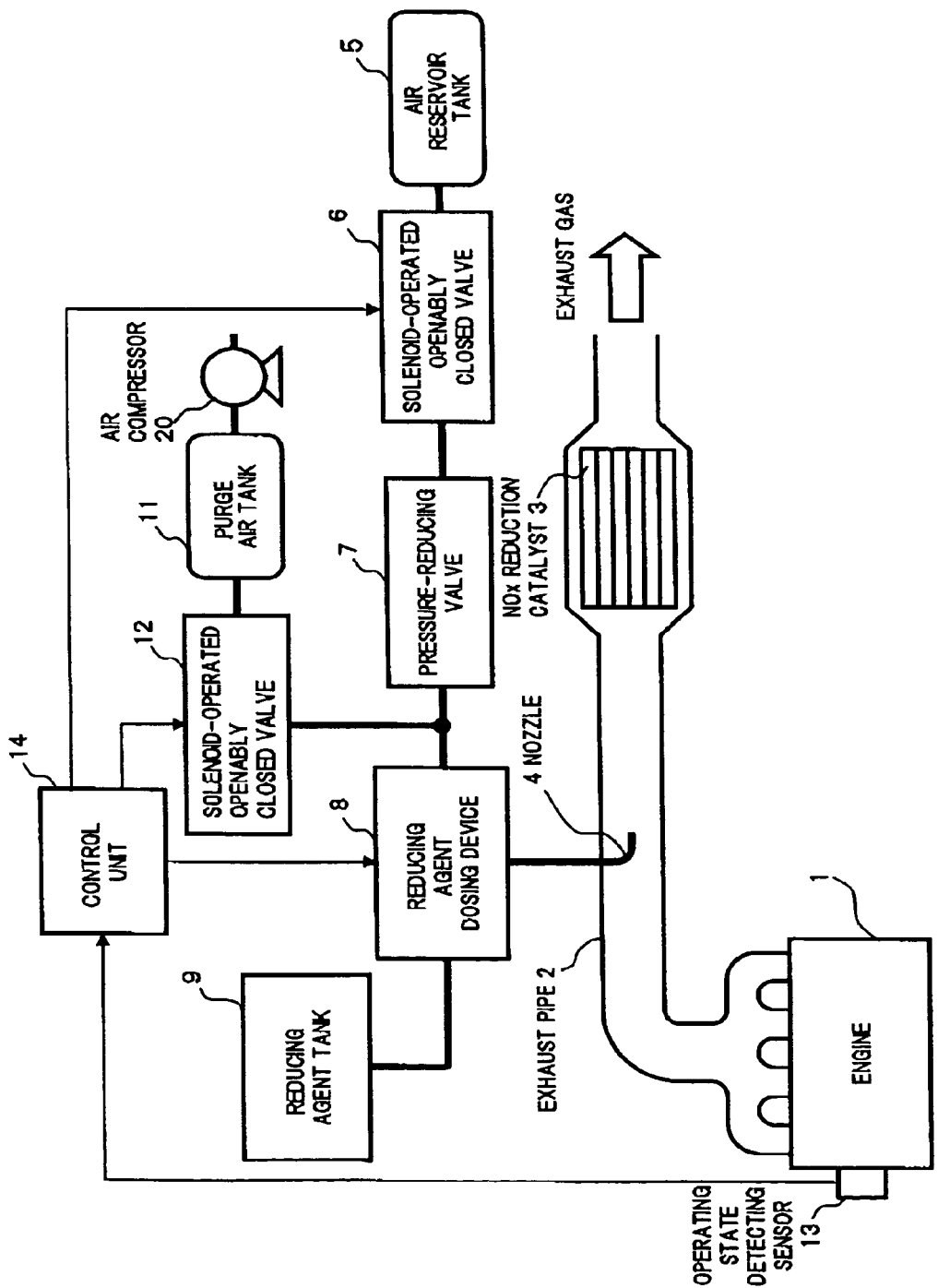
FIG. 2 is a view illustrating a structural constitution of an exhaust gas purification apparatus according to a second embodiment of the present invention.

FIG. 2 shows the overall construction of a second embodiment of an exhaust gas purification apparatus according to the present invention. The descriptions of constructions identical to those in the previous first embodiment have been omitted by utilizing the same reference symbols, in order to avoid duplicated descriptions (the same applies for the other embodiments hereunder).

In the present embodiment, a construction is adopted in which compressed air is supplied to a purge air tank 11 using an air compressor 20 for pressurizing the atmosphere to a predetermined pressure. At this time, the air compressor 20 may be operated and controlled according to the output from a pressure switch installed for example in the purge air tank 11, so that the pressure of the compressed air stored in the purge air tank 11 is within a predetermined range.

According to such a construction, compressed air of an optional pressure can be supplied to the purge air tank 11 using the air compressor 20, regardless of the pressure of the compressed air stored in the air reservoir tank 5. Therefore, if the supply pressure of the compressed air from the air compressor 20 is set to a pressure whereby liquid reducing agent remaining in the nozzle 4 can be forcibly discharged, clogging of the nozzle 4 can be effectively prevented.

Figure 3:
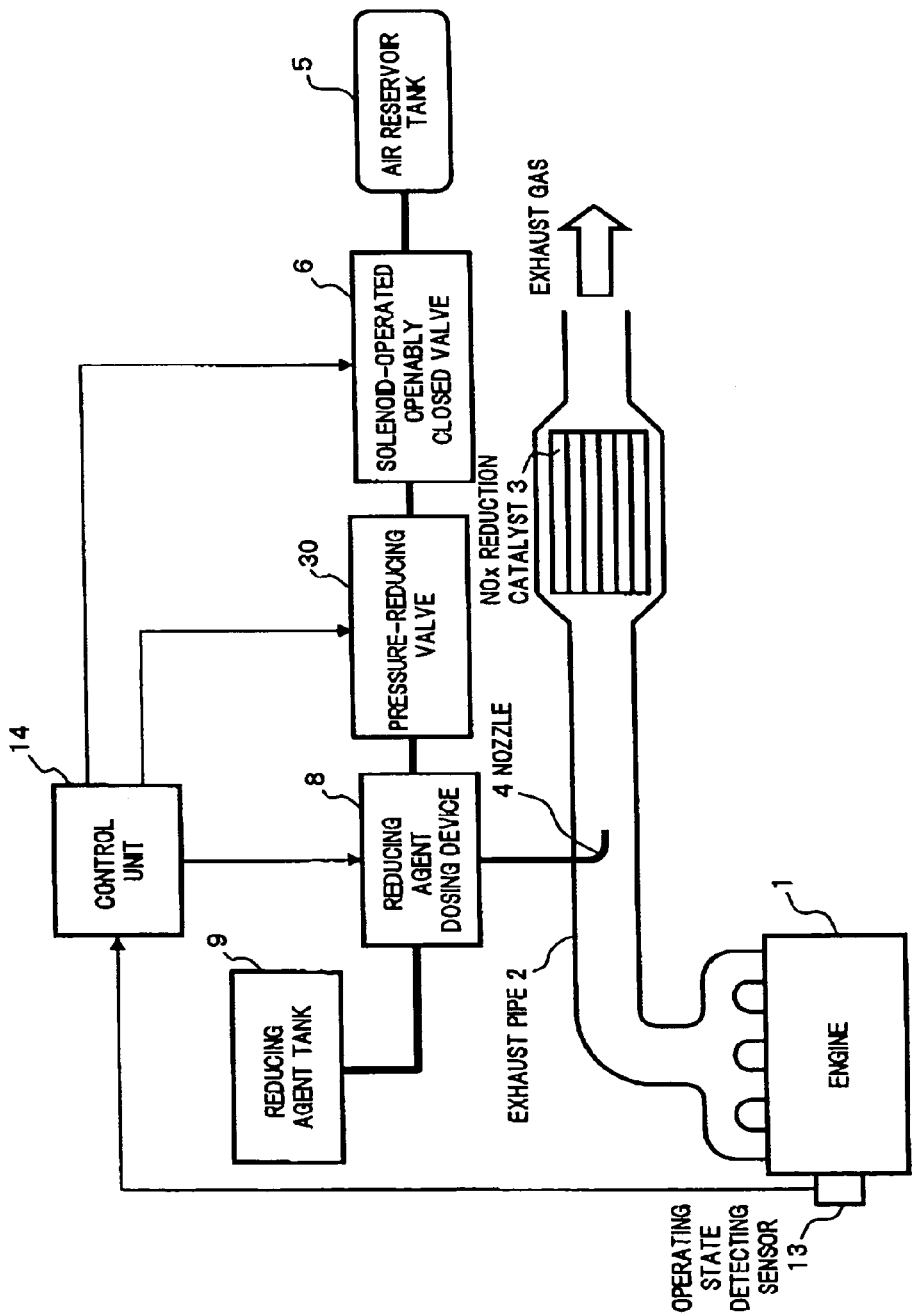
FIG. 3 is a view illustrating a structural constitution of an exhaust gas purification apparatus according to a third embodiment of the present invention.

FIG. 3 shows the overall construction of a third embodiment of an exhaust gas purification apparatus according to the present invention.

In the present embodiment, a construction is adopted in which, instead of the pressure-reducing valve 7 in the first and second embodiments, a pressure reducing valve 30 is provided that can be switched to either let compressed air stored in the air reservoir tank 5 pass through directly, or to reduce the pressure to a predetermined pressure as it passes through, and the switching is controlled by a control unit 14.

The control unit 14 opens a solenoid-operated openably closed valve 6 when the liquid reducing agent is injection-supplied, and controls the switching of the pressure-reducing valve 30 so as to reduce the pressure of the compressed air. Furthermore, the control unit 14 opens the solenoid-operated openably closed valve 6 for a predetermined period after injection of the liquid reducing agent is stopped, and also controls the switching of the pressure reducing valve 30 so that the compressed air passes through it directly. Therefore, when the liquid reducing agent is injection-supplied, compressed air stored in the air reservoir tank 5 is reduced in pressure, and supplied to a reducing agent dosing device 8. On the other hand, after injection of the liquid reducing agent is stopped, it is supplied to the reducing agent dosing device 8 directly for a predetermined period.

Consequently, since it is possible to optionally supply compressed air and high pressure air from the air reservoir tank 5, then compared with the previous first and second embodiments, the number of solenoid-operated openably closed valves may be reduced, and also a purge air tank and a check valve are not required. Moreover, it is possible to reduce the parts count by sharing parts, thus forming a simple construction, and hence the space and cost can be reduced.

Figure 4:
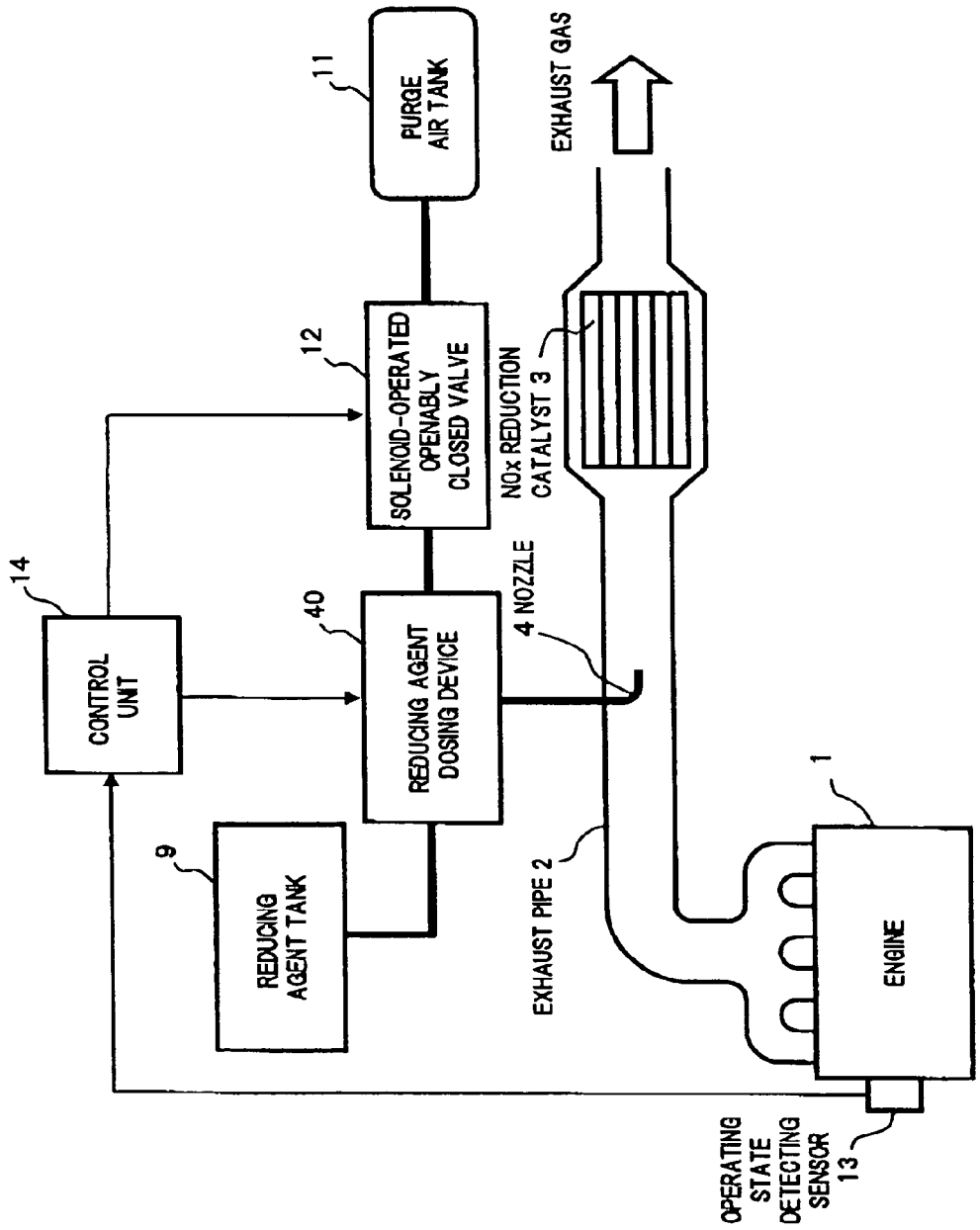
FIG. 4 is a view illustrating a structural constitution of an exhaust gas purification apparatus according to a fourth embodiment of the present invention.

FIG. 4 shows the overall construction of a fourth embodiment of an exhaust gas purification apparatus according to the present invention.

In the present embodiment, a construction is adopted in which, when a liquid reducing agent is injection-supplied, compressed air is not used, but the liquid reducing agent is pressurized by a reducing agent dosing device 40, for injection supply.

According to such a construction, since it is not necessary to supply compressed air from the air reservoir tank to the reducing agent dosing device, as in the previous first to third embodiments, the number of solenoid-operated openably closed valves is reduced, and also a pressure-reducing valve is not required, and hence the space and cost can be reduced. Furthermore, since compressed air for dosing the reducing agent is not required, there is no need to increase the size of the air reservoir tank provided for other purposes.

As described above, in an exhaust gas purification apparatus according to the present invention, when the injection-supply of a liquid reducing agent is stopped, the liquid reducing agent remaining in the nozzle is forcibly discharged. Therefore, the occurrence of clogging inside the nozzle is prevented, and a failure in the reduction and purification of the NOx, caused by a shortage in the supply of the liquid reducing agent can be suppressed, which is extremely advantageous.

What I claim is:

1. An exhaust gas purification apparatus of an engine comprising:

a nitrogen oxide reduction catalyst arranged in an engine exhaust gas passage to reduce and purify nitrogen oxide in exhaust gas using a liquid reducing agent;

a nozzle having an injection hole that opens into the exhaust gas passage, and positioned on an exhaust gas upstream side of said nitrogen oxide reduction catalyst;

an operating state detecting device that detects an engine operating state;

a reducing agent injection-supply device that injection-supplies the liquid reducing agent into the exhaust gas passage from said nozzle injection hole during operation of the engine according to an injection flow rate of the liquid reducing agent based on the engine operating state detected by said operating state detecting device; and a pressure-reducing device switchable to either let compressed air from an air reservoir tank directly pass to supply high pressure air into said nozzle for a predetermined period during operation of the engine when the injection flow rate of said liquid reducing agent from said reducing agent injection-supply device becomes zero, or to reduce the pressure of the compressed air from the air reservoir tank to a predetermined pressure as it passes through said pressure-reducing device, wherein said reducing agent injection supply device uses the compressed air that has been reduced in pressure to the predetermined pressure.

2. An exhaust gas purification apparatus of an engine according to claim 1, wherein said reducing agent injection-supply device reduces a pressure of compressed air stored in the air reservoir tank to a predetermined pressure, mixes the compressed air whose pressure is reduced with the liquid reducing agent to transform the liquid reducing agent into an atomized state, and then injection supplies the atomized liquid reducing agent from said nozzle injection hole into the exhaust gas passage.

* * * * *